United States Patent
Suciu

(10) Patent No.: US 7,968,609 B2
(45) Date of Patent: Jun. 28, 2011

(54) MIXTURES OF NANOPARTICLES

(75) Inventor: Crina Silvia Suciu, Bergen (NO)

(73) Assignee: Prototech, AS, Bergen (NO)

( * ) Notice: Subject to any disclaimer, the term of this patent is extended or adjusted under 35 U.S.C. 154(b) by 769 days.

(21) Appl. No.: 11/806,798

(22) Filed: Jun. 4, 2007

(65) Prior Publication Data

US 2009/0189115 A1    Jul. 30, 2009

(51) Int. Cl.
*B01D 21/01* (2006.01)
*C01B 33/152* (2006.01)
*C01F 7/02* (2006.01)
*C09K 3/00* (2006.01)

(52) U.S. Cl. ..... 516/98; 516/111; 516/112; 252/182.12; 977/773

(58) Field of Classification Search .................. 423/601; 428/402; 516/111, 112, 773; 252/182.12; 977/773
See application file for complete search history.

(56) References Cited

U.S. PATENT DOCUMENTS

| 6,409,940 | B1 * | 6/2002 | Gaffney et al. | 252/373 |
| 2004/0018409 | A1 * | 1/2004 | Hui et al. | 429/33 |
| 2006/0222564 | A1 * | 10/2006 | Dale et al. | 422/56 |

OTHER PUBLICATIONS

Laberty-Robert, Powder synthesis of nanocrystalline ZrO2-8% Y2O3 via a polymerization May 16, 2001, Material Research Bulletin 36 (2001) 2083-2101.*

* cited by examiner

*Primary Examiner* — Ling-Siu Choi
*Assistant Examiner* — Monique Peets
(74) *Attorney, Agent, or Firm* — Dobe Law Group, LLC; Christopher Aniedobe

(57) ABSTRACT

Methods of sol-gel processing for the preparation of mixed gels and nanoparticles are described. Further, mixed gels and nanoparticles obtained by the method are also disclosed. More specifically, a process for mixture of NiO nanoparticles and Yttria stabilized Zirconia nanoparticles obtained by only one sol-gel process is described.

16 Claims, 4 Drawing Sheets

MIXTURES OF NANOPARTICLES

The present invention relates to method of sol-gel processing for the preparation of mixed gels and nanoparticles. The invention also relates mixed gels and nanoparticles obtained by the method.

Solid Oxide Fuel Cells (SOFCs) are very efficient devices for the electrochemical conversion of chemical energy of fuels into electricity. The SOFC consists of two porous ceramic electrodes (anode and cathode) separated by dense oxide ion conducting ceramic electrolyte. The traditional materials used in SOFCs are strontium doped lanthanum manganite (LSM) as cathode, yttria stabilized zirconia (YSZ) as electrolyte and NiO/YSZ composite as anode.

The development tends towards anode supported cells where an anode substrate becomes the main part. The characteristics of the anode material are: to suppress the sintering of Ni grains during high temperature operation of SOFCs (over 1000° C.) and to possess electrochemical activity.

The fuel gas is oxidized by electrochemical reactions at the Ni/electrolyte/fuel gas interface, the so called three-phase boundary (TPB) region. Thus, the electrochemical activity of the cermet anode depends on the length of TPB region. Therefore, the stability and the activity of Ni/YSZ anode are strongly influenced by the morphology of the metal (Ni) and ceramic (YSZ) interface.

Fine particles as a precursor for SOFC components may increase the ionic conductivity due to a more open crystal structure and a higher density of grain boundaries. Also, the required sintering temperature is much lower than when using normal precursor powders, resulting in less manufacturing costs, and more flexibility in the manufacturing process.

It has been reported that the stability of a Ni/YSZ cermet anode is improved at high temperature (1000° C.) operation of SOFCs by controlling its morphology using NiO/YSZ composite particles. These particles are composed of NiO grains covered with fine YSZ grains. The anode fabricated with these particles achieved stable long-term SOFC operation, because the YSZ grains on the Ni network successfully prevented the grain growth of Ni at high temperature.

Moreover, the electrochemical activity increases with increasing length of the TPB region. The TPB region of the anode is essentially influenced by the NiO and YSZ ratio and by the morphology (grain size, connection between grains, porosity). Therefore, the ratio of Ni and YSZ as well as the morphology of the starting powders are important factors to control the morphology of anode to achieve a high activity anode.

Many methods for preparing nanoparticles have been developed lately including spray-pyrolysis, electrostatic atomization, chemical and electrochemical vapour deposition and plasma methods. The anode is usually manufactured by a solid state method, where separately prepared powders are subsequently subjected to homogenization, sintering and reduction to form a Ni/YSZ cermet. The mixing of the NiO and YSZ powders is usually carried out with solvent by conventional ball milling.

The aim of the present invention is to produce nickel oxide/yttria-stabilized zirconia gels and nanopowders. Further, it is an aim of the present invention to use these these as precursors to obtain a high-activity and stable cermet anode.

The homogeneous mixture of NiO/YSZ nanopowders according to the present invention has been synthesized by a new sol-gel method. The new method uses sucrose and pectin as organic precursors and the final powder is obtained directly from one sol-gel process. The sol-gel process is characterized by flexibility, the usage of non-aggressive solutions, low cost, good mixing of the starting materials and good chemical homogeneity of the final products. By this process NiO/8YSZ nanopowders are easily obtained at the desired ratio and a ball milling process is not required to obtain the final powder.

The thermal decomposition of gels, the morphology and other characteristics of the obtained powder were analyzed by Thermal Analysis (TG/DTG), nitrogen adsorption (BET), X-ray diffraction (XRD), and Transmission Electron Microscopy (TEM).

The TG/DTG method was used to investigate the chemical and physical properties of the sample during heating.

The BET method was used to determine the specific surface area of the powder. Using this and density of the material and assuming that the particles are round the size of the particles can be determined.

The XRD method was used to determine the crystal structure and chemical composition of the sample. Using the Scherrer formula the mean crystallite sizes of both NiO and YSZ particles were determined.

The TEM method was used to determine the morphology of the sample, the connection between the grains and the mean particle size of both NiO and YSZ phases of the obtained powder.

A first aspect of the present invention thus relates to a method of sol-gel processing for the preparation of gels, characterized in that at least two inorganic metal salts, a doping agent, pectin and mono or disaccharides are used, and that said method comprises the steps:

a) preparing a first aqueous solution comprising said inorganic metal salts and said doping agent, and preparing a second aqueous solution comprising said mono or disaccharides, b) mixing the first and second solutions to a third solution, preferable at a temperature from about 100-110° C., c) incubating the combined solution from step b) at an elevated temperature of about 100 to 110° C. for sufficient time (about 3 hours) in order to gelatinize the third solution to a gel material.

In a preferred embodiment of this aspect, the metal salt contains a metal selected from the group consisting of aluminium, hafnium, silicon, zirconium, cerium, lanthanum, germanium, tantalum, nickel, combinations thereof, and combinations thereof with titanium.

A preferred embodiment of the doping agent is a salt selected from the group containing $Y_2O_3$, $Sc_2O_3$, $CaO$, $MgO$, $Pr_2O_3$, $Nd_2O_3$, $Sm_2O_3$ and $Gd_2O_3$.

A preferred embodiment for the preparation of mixtures of NiO nanoparticles and Yttria Stabilized Zirconia (8YSZ) nanoparticles uses salts of nickel and zirconium, and the doping agent is a salt of Yttrium.

A preferred embodiment of the invention uses sucrose and pectin as precursors.

A further aspect of the present invention relates to a method of sol-gel processing for the preparation of nanoparticles, characterized in that at least two inorganic metal salts, a doping agent, pectin and mono or disaccharides are used, and that said method comprises the steps:

a) preparing a first aqueous solution comprising said inorganic metal salts and said doping agent, and preparing a second aqueous solution comprising said mono or disaccharides, b) mixing the first and second solutions to a third solution, preferable at a temperature from about 100-110° C., c) incubating the combined solution from step b) at an elevated temperature of about 100 to 110° C. for sufficient time (about 3 hours) in order to gelatinize the third solution to a gel material.

d) thermal treatment of the gelatinized material from step c) at a temperature of from 500 to 1200° C., preferable about 1000° C. in order to obtain a powder.

In a preferred embodiment of this aspect, the metal salt contains a metal selected from the group consisting of aluminium, hafnium, silicon, zirconium, cerium, lanthanum, germanium, tantalum, nickel, combinations thereof, and combinations thereof with titanium.

A preferred embodiment of the doping agent is a salt selected from the group containing $Y_2O_3$, $Sc_2O_3$, CaO, MgO, $Pr_2O_3$, $Nd_2O_3$, $Sm_2O_3$ and $Gd_2O_3$.

A preferred embodiment for the preparation of mixtures of NiO nanoparticles and Yttria Stabilized Zirconia (8YSZ) nanoparticles uses salts of nickel and zirconium, and the doping agent is a salt of Yttrium.

A preferred embodiment of the invention uses sucrose and pectin as precursors.

A further preferred aspect of the present invention relates to a mixture of nanoparticles, wherein said mixture contains NiO nanoparticles and Yttria stabilized Zirconia nanoparticles obtained directly from one sol-gel process.

A preferred embodiment contains 8% Yttria.

A further preferred embodiment relates to a mixture of nanoparticles, wherein the particle sizes after treatment at 1000° C. are smaller than 135 nm in at least one direction.

EXPERIMENTAL SECTION

Example 1

Preparation of Mixed NiO Gels/Nanoparticles with 8% Yttria Stabilized Zirconia (8YSZ) Gels/Nanoparticles Zirconium tetrachloride ($ZrCl_4$, Sigma-Aldrich, technical purity) and yttrium nitrate hexahydrate ($Y(NO_3)_3 \cdot 6H_2O$, Sigma-Aldrich, 99.9% purity) and nickel nitrate hexahydrate $Ni(NO_3)_2 \cdot 6H_2O$ (Merck KGaA, 99% purity) were used as starting materials. The appropriate quantities for a final composition of 8 mol % $Y_2O_3$ to $ZrO_2$ were calculated and used. Also, the appropriate quantities for a final Ni:YSZ ratio of 40:60 were calculated and used. Commercial sucrose and pectin were used for gel preparation in the sucrose:pectin mass ratios 25:1.

Figure 1:
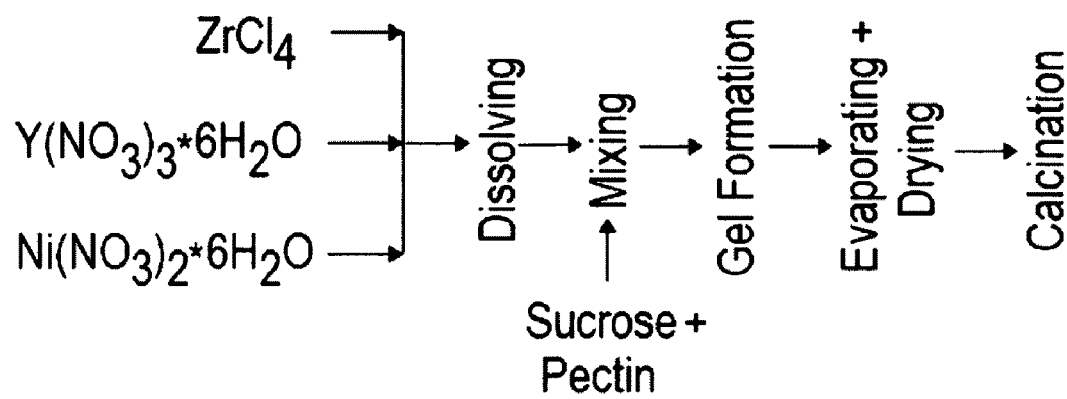
FIG. 1 is a schematic illustration of one embodiment of the invention, showing a process for the preparation of mixed gels and particles as described in example 1.

We followed the operation scheme shown in FIG. 1. The salts are dissolved in water forming a clear solution at a temperature of about 100° C. on a warming plate. The sucrose:pectin mixture is added to the solution under continuous stirring. The final solution, having the pH of 0.5-1, is maintained on the warming plate at a temperature lower than 100-110° C. for about 3 hours. In this period of time the gel temperature lower than 100-110° C. for about 3 hours. In this period of time the gel is formed from the clear solution, the solution starts to slowly evaporate and in the end the dried gel is obtained. The final dried gel, which has the appearance of a black dried resin, is calcinated at 1000° C. in order to obtain NiO/YSZ powder.

Addition of sucrose and pectin in the solution of the metal cations forms a polymer matrix in which the $Ni^{2+}$, $Zr^{4+}$ and $Y^{3+}$ cations are distributed through the polymeric network structure. Sucrose being always in excess acts as a strong chelating agent and as a pattern material and by calcination of this complex mass the fine particles is obtained. The chelated complex mass is obtained by polymerization via gel formation and the pectin fulfils the role of gelling agent and stabilizer.

The calcination treatment was applied in steps to allow the organic precursors to be burnt off and at the same time to allow to all the processes to occur. Use of large content of organic precursors it is not recommended because the carbon removal from the material can be problematic and impurities of carbon particles might be present in the final product.

Thus, the calcination treatment has a plateau at 500° C. for 1 h and another one at 1000° C. for 1 h at a heating rate of 100° C./h. During heating, the metal ion complex is decomposed into $CO_2$ and $H_2O$ and a large amount of heat is generated. These processes produce gases and in this way agglomeration is prevented.

Results

Figure 2:
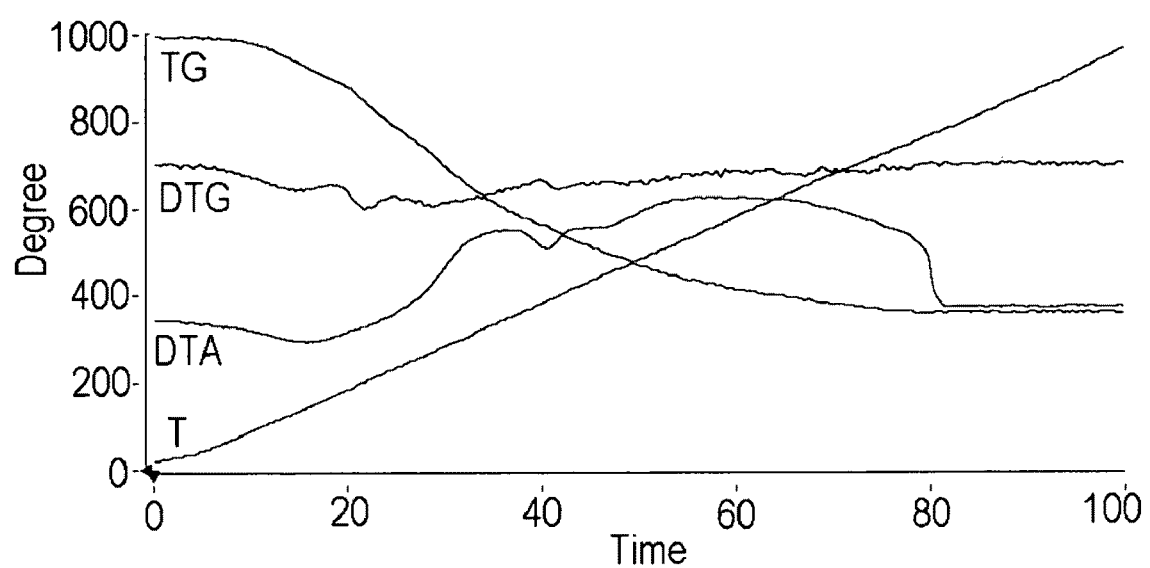
FIG. 2 shows the result of thermal analyses of a sample as described in example 1.

The thermal analyses were performed on dried YSZ gel using a Derivatograph Q 1500 (MOM Hungary) to determine the chemical and physical properties of the samples as a function of temperature or time based on the thermal effects that occur during the calcinations process. A small quantity of the dried gel was used for analysis in air up to 1000° C. at a heating rate of 10° C./min. In the end, the temperature-time curves were analyzed as obtained from the data acquisition software of the derivatograph (see FIG. 2 which shows a thermal analyses of the sample at 1000° C.).

An endothermic effect starts at 100° C. and continues until 200° C. with a mass loss of 12%. This can be due to water loss. From 200° C. until 400° C. an exothermic process occurs due to the decomposition of the organic components. Starting at 400° C. two other exothermic effects can be distinguished: the first one between 400 and 475° C. and the second one between 475 and 800° C. These effects can be due to the formation of NiO structure and of the solid solutions of $Y_2O_3$ and $ZrO_2$. The mass loss during the exothermic effects is 52%, giving a total mass loss of 64%.

Due to the numerous effects which are taking place up to 800° C. it is very difficult to distinguish and attribute a precise temperature range for each one. A combined thermal and XRD analysis should be able to determine the different effects and phases more accurately at specific temperatures.

The specific surface area of the samples was determined using a Gemini 2380 apparatus from Micromeritics. A small quantity of the obtained powder was degassed at 300° C. for 3 hours under vacuum before analysis. A single point analysis gave 4.76 $m^2/g$, and a multipoint analysis 4.95 $m^2/g$ both with very good reproducibility. Using a density for 40:60 NiO:YSZ of 6208 $kg/m^3$ and assuming the particles to be round the diameter of the particle can be estimated. This would correspond to mean particle diameters of 203 nm and 195 nm, respectively.

Figure 3:
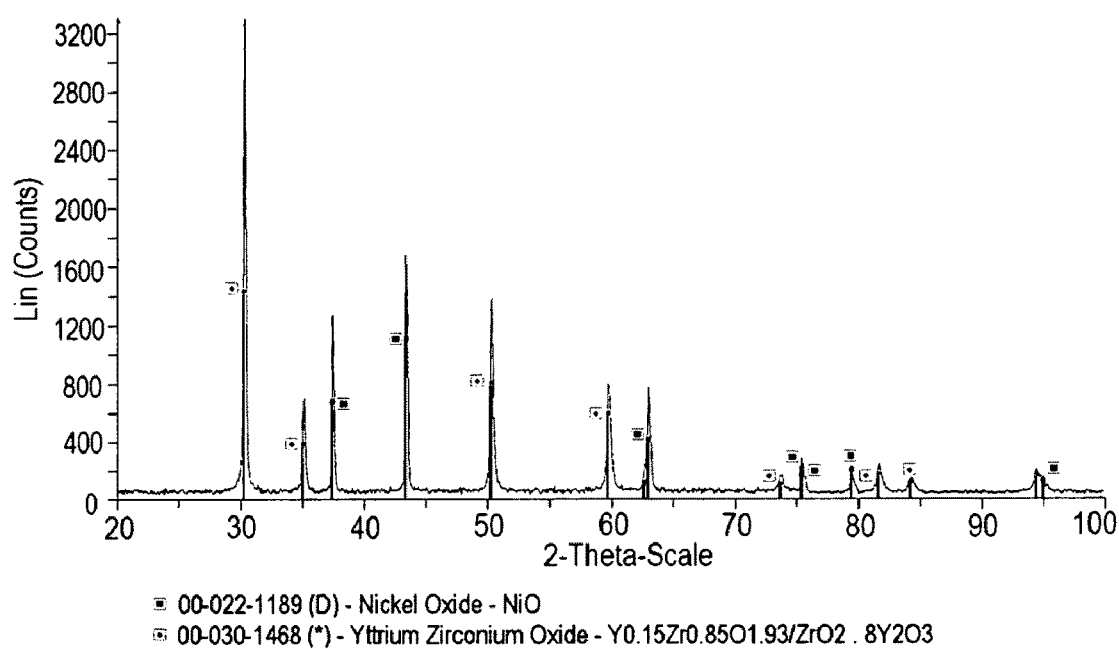
FIG. 3 shows x-ray diffraction pattern of a sample as described in example 1.

X-ray diffraction (XRD) was carried out with CuK-α radiation on a Bruker diffractometer (see FIG. 3). The intensities were measured from 2θ=20 to 100° with a step size of 0.02° and a counting rate of 3 seconds per scanning step. The obtained diagram is shown in FIG. 3 and it shows the presence of 2 phases, NiO and $ZrO_2$, with a cubic type structure. The presence of other phases such as amorphous phase, single $Y_2O_3$, $ZrO_2$ tetragonal or monoclinic was not observed.

The auto-coherent domain crystallite size was deduced from the line broadening by means of the Scherrer formula.

$$D = \frac{k \cdot \lambda}{B \cdot \cos\theta}.$$

where k—a constant equal to unity, $\lambda$=0.15406 nm, the wavelength of CuKalpha1, B—the Integral Breadth (rad), corrected for instrumental broadening and $\theta$ is the top position (14.5 deg used for all lines).

The values of the structural parameters are given in the following table.

| | | |
|---|---|---|
| NiO | % NiO | 49.19 |
| | a, b, c | 4.178906 |
| | y | 0.095004 |
| | D (nm) | 58.95 |
| $ZrO_2$ | % $ZrO_2$ | 50.81 |
| | a, b, c | 5.141476 |
| | y | 0.156218 |
| | D (nm) | 35.85 |

Figure 4:
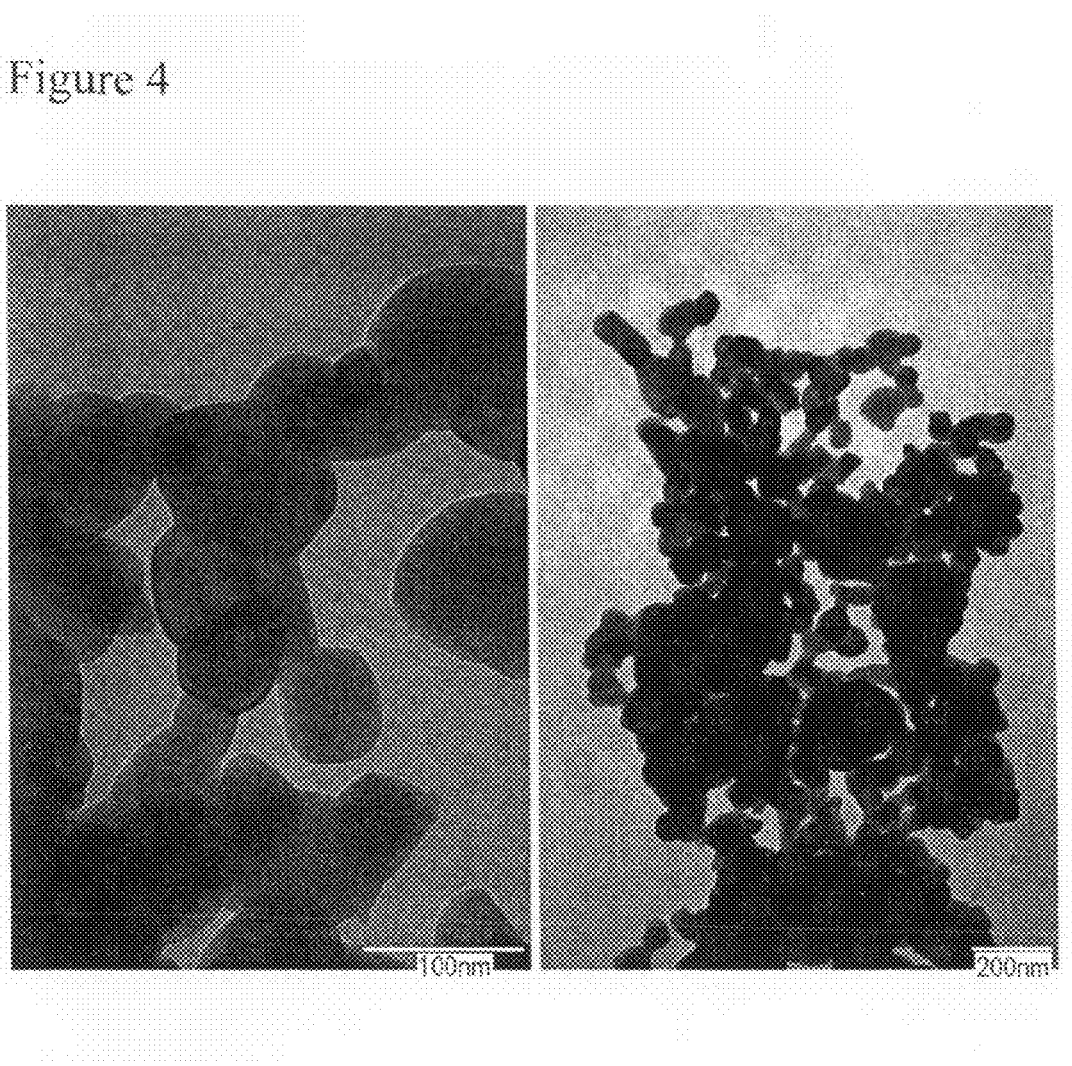
FIG. 4 is an electron microscopy of mixed gels and particles at 50 000 and 100 000 times magnification at 1000° C.

The morphology of the obtained powders was investigated using Transmission Electron Microscopy (TEM) performed by a JEOL-JEM-1011 transmission microscope. The samples were dispersed in water under stirring and one drop taken from the solution was deposited on a copper grid. Previously, the grids underwent a carbon deposition process under vacuum followed by a glow discharge. FIG. 4 shows the TEM images of the sample at 1000° C.

Distinct particles with fairly uniform dimensions with a bimodal distribution with modes at about 35 and 135 nm are obtained. This means that the YSZ nanoparticles contain 1-2 crystallites and NiO nanoparticles might contain several crystallites. The composite particles also had good interface connection between NiO and YSZ.

CONCLUSION

NiO/YSZ composite gels and particles with various YSZ content were synthesized by spray sol-gel method using sucrose and pectin as organic precursors. The obtained composite particles can be used to fabricate cermet anodes.

During calcination, the metal ion complex is decomposed and large amount of gases and heat are generated. The degree of porosity of the gel is a direct consequence of the amount of gases that escape during calcinations treatment.

The resultant composite particles provided good connections of YSZ grains and NiO grains without the milling process which might decrease the polarization loss in a fabricated anode.

The obtained particles seem to be smaller than 135 nm and consist of 1-2 crystallites for YSZ particles and several crystallites for NiO particles.

The invention claimed is:

1. A method of sol-gel processing for the preparation of nanoparticles, comprises the steps of:
    a) preparing a first aqueous solution comprising at least two inorganic metal salts and a doping agent, and preparing a second aqueous solution comprising pectin and mono or disaccharides;
    b) mixing the first and second solutions to form a third solution, at a temperature from about 100-110° C.;
    c) incubating the third solution at an elevated temperature of about 100 to 110° C. for sufficient time in order to gelatinize the third solution to a gelatinized material;
    d) thermal treatment of the gelatinized material from step c) at a temperature of from 500 to 1200° C., in order to obtain a powder of nanoparticles.

2. The method according to claim 1, wherein the nanoparticles are monodisperse.

3. The method according to claim 1, wherein the nanoparticles are less than 150 nanometer in at least one dimension.

4. The method according to claim 1, wherein the at least two inorganic metal salts contains at least one metal selected from the group consisting of aluminum, hafnium, silicon, zirconium, cerium, lanthanum, germanium, tantalum, nickel and titanium.

5. The method according to claim 1, wherein the at least two inorganic metal salts contains zirconium salt.

6. The method according to claim 5, wherein the zirconium salt is a salt selected from the group consisting of $ZrCl_4$, $ZrO(NO_3)_3$ and $ZrOCl_2$.

7. The method according to claim 4, wherein the at least two inorganic metal salts contains nickel salt.

8. The method according to claim 7, wherein the nickel salt is selected from the group consisting of $NiCO_3$, $Ni(COOH)_2$, $Ni(NO_3)_2.6H_2O$, $NiSO_4.7H_2O$.

9. The method according to claim 4, wherein the at least two inorganic metal salts are salts of nickel and zirconium.

10. The method according to claim 1, wherein the doping agent is a salt selected from the group consisting of $Y_2O_3$, CaO, MgO, $Pr_2O_3$, $Nd_2O_3$, $Sc_2O_3$ and $Gd_2O_3$.

11. The method according to claim 10, wherein the doping agent is a salt containing yttrium.

12. The method according to claim 11, wherein the salt is $Y(NO_3)_3.6H_2O$.

13. The method according to claim 1, wherein the at least two inorganic metal salts are salts of nickel and zirconium, and the doping agent is a salt of Yttrium.

14. The method according to claim 1, wherein said mono or disaccharides is at least a compound selected from the group consisting of sucrose, maltose, lactose, fructose and glucose.

15. The method according to claim 14, wherein the mono or disaccharide is sucrose, or a mixture of sucrose and other mono or disaccharides.

16. The method according to claim 1, wherein the second solution contains sucrose and pectin.

* * * * *